June 28, 1927.
J. F. CRAIG
1,633,773
VEHICLE BRAKE MECHANISM
Filed Sept. 22, 1922
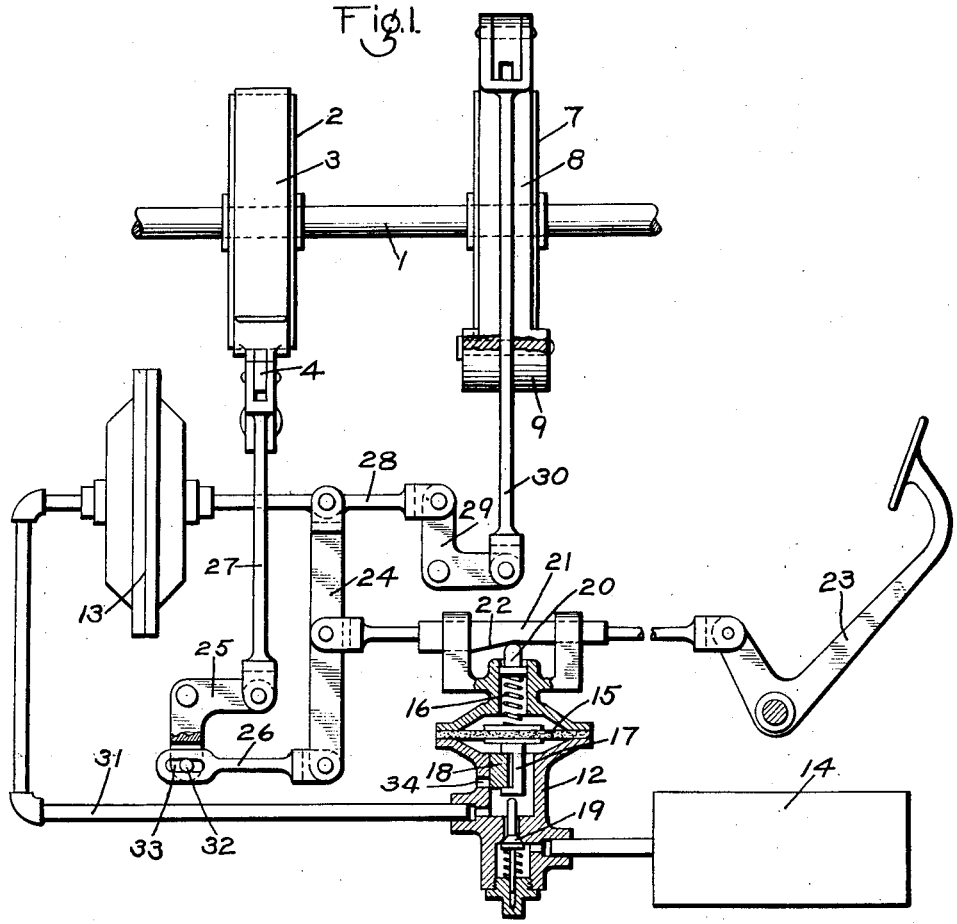
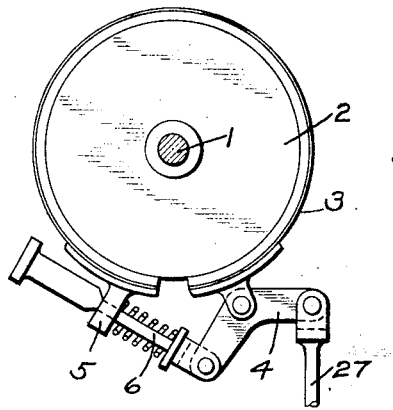
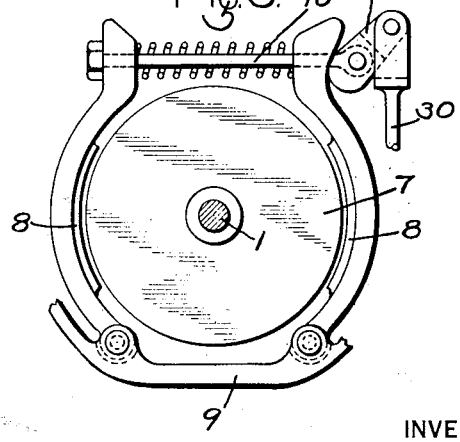
INVENTOR
JOHN F. CRAIG
BY *Wm. M. Cady*
ATTORNEY Patented June 28, 1927.

1,633,773

UNITED STATES PATENT OFFICE.

JOHN F. CRAIG, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE MECHANISM.

Application filed September 22, 1922. Serial No. 589,764.

This invention relates to fluid pressure brakes and more particularly to a fluid pressure brake equipment for a motor vehicle.

The principal object of my invention is to provide a motor vehicle brake equipment having a normally active fluid pressure brake and a normally inactive mechanical brake and means for causing the action of the mechanical brake in case of failure of the fluid pressure brake.

In the accompanying drawing; Fig. 1 is a diagrammatic view, partly in section, of a brake equipment for a motor vehicle, embodying my invention; Fig. 2 a face view of the brake members employed for mechanical braking; and Fig. 3 a face view of the brake members employed for fluid pressure braking.

According to the preferred construction as shown in the drawing, the braking members are applied to the propeller shaft 1 of a motor vehicle, the mechanical braking members comprising a brake disk 2 and an enclosing brake band 3 of the usual construction, one end of which is pivotally connected to a bell crank 4, the other end having a lug 5 through a hole in which a rod 6 extends. The rod 6 is pivotally connected to the bell crank 4, so that by rocking the bell crank, the ends of the brake band 3 are drawn together, causing the band to frictionally engage the disk 2.

The fluid pressure controlled braking members may comprise a disk 7 and a pair of oppositely disposed metal brake shoes 8 having one end of each brake shoe pivotally connected to a supporting member 9 and having the other ends provided with apertured lugs to receive a rod 10. One of the lugs is provided with a cam face adapted to be engaged by a cam arm 11 and the rod 10 is pivotally connected to said arm, so that by rocking the cam arm, the brake shoes 8 are brought into frictional engagement with the disk 7.

The fluid pressure brake includes a controlling valve device 12, a diaphragm brake chamber 13, and a reservoir 14 containing fluid under pressure. The valve device 12 may comprise a casing containing a flexible diaphragm 15, subject on one side to the pressure of a coil spring 16 and having a stem 17 at the opposite side for operating an exhaust slide valve 18 and a supply valve 19. Engaging the spring 16 is a depressible member 20 which is adapted to be operated by a sliding bar 21 having an inclined face 22.

The bar 21 is pivotally connected at one end to a pedal lever 23 and at the other end to a link 24. One end of the link 24 is connected to a bell crank 25 through a connecting link 26 and the bell crank 25 is connected to the bell crank 4 through a rod 27. The other end of the link 24 is pivotally connected to rod 28 which is adapted to be operated by the flexible diaphragm (not shown) contained in the brake chamber 13.

The outer end of the diaphragm rod 28 is pivotally connected to a bell crank 29 which in turn is pivotally connected to a rod 30 for operating the cam lever 11.

In operation, if it is desired to apply the brakes on the motor vehicle, the pedal lever 23 is depressed and thereby the bar 21 is moved forward so that the incline 22 engages and depresses the member 20. The spring 16 is thus compressed and acts to shift the diaphragm 15 so as to open the valve 19. Fluid under pressure is then supplied from reservoir 14, through pipe 31 to the brake chamber 13 and the flexible diaphragm in said chamber is moved so as to project the rod 28. The cam lever 11 is then operated through the connecting rod 30 and bell crank 29 so as to force the brake shoes 8 into engagement with the brake disk 7, thus causing an application of the brakes.

The pivot pin 32 connecting the link 26 with bell crank 25 works in an elongated slot 33 in the link 26, so that in the above described movement of the pedal lever 23 to apply the brakes, the bell crank 25 is not moved by the movement of the link 26 through its connection with the bar 21 and furthermore, since the bar 24 is connected to the diaphragm rod 28, the movement of the rod 28 to apply the brakes by fluid pressure causes a movement of the bar 24, with the pivotal connection to the bar 21 acting as a fulcrum, so that the link 26 is moved rearwardly. This movement tends to restore the lost motion previously taken up by the movement of the bar 21, so that a further movement of the pedal lever 23 to apply the fluid pressure brakes with greater force, or an unintentional further movement of the pedal lever will not be operative to cause a movement of the bell crank 25.

In order to release the fluid pressure brakes, the pressure on the pedal lever 23 is relieved, so that the rod 21 will move to the left, to the position shown in Fig. 1, permitting the spring 16 to expand and thereby relieve the spring pressure on diaphragm 15. The brake cylinder pressure acting on the opposite side of the diaphragm 15 then shifts the diaphragm upwardly, causing the release valve 18 to uncover the release port 34 and thus effecting the release of air from the brake cylinder 13.

It will thus be seen that the mechanical brake is maintained entirely inactive so long as the fluid pressure brake acts. If, for any reason, the fluid pressure brake should fail to act upon depressing the pedal lever 23 then the continued movement of the pedal lever will be effective to apply the mechanical brake, since the link 24 is moved by the bar 21 with the rod 28 acting as a fulcrum after the lost motion due to the slot 33 has been taken up and after said rod 28 and the flexible diaphragm (not shown) in cylinder 13 have moved to brake applied position, with the diaphragm stopped from further movement to the right by engagement with the inner face of the right hand section of the cylinder 13, and consequently further movement of the pedal lever 23 will cause a forward movement of the link 24 and the link 26, operating the bell crank 25 so that the rod 27 is actuated to rock the bell crank 4 and thereby apply the mechanical brake by the frictional engagement of the brake band 3 with the disk 2.

By means of the above described construction, the usual braking is provided by the fluid pressure power brake while the mechanical brake remains inactive, so that in an emergency, if the power brake should fail, the mechanical brake, which has not been subjected to wear, will automatically be brought into action.

It will be evident that my invention may be applied in connection with other arrangements of brake members, such as external contact and internal expanding brake bands applied to a common drum on the rear wheel, the power brake mechanism being connected to one brake band and the mechanical brake mechanism to the other brake band.

Having now described my invention, what I claim as new and desire to secure by Letters Patent, is:—

1. In a vehicle brake, the combination with two sets of brake applying members, of fluid pressure means for operating one set of brake applying members, mechanical means for operating the other set of brake members, and means operated by the fluid pressure means for preventing the operation of the mechanically operated brake applying means.

2. In a vehicle brake, the combination with two sets of brake applying members, of fluid pressure means for operating one set of brake applying members, mechanical means for operating the other set of brake members, and means operated upon movement of the fluid pressure operated brake applying members for preventing operation of the mechanically operated brake applying members.

3. In a vehicle brake, the combination with two sets of brake applying members, of fluid pressure means for operating one set of brake applying members, mechanical means movable to control said fluid pressure means and adapted upon a further movement to operate the other set of brake applying members, and means operated upon movement of the fluid pressure controlled brake applying members for preventing operation of the mechanically controlled brake applying members upon said further movement of the mechanical means.

4. In a vehicle brake, the combination with two sets of brake applying members, of a fluid pressure brake chamber, a rod operatively connecting the brake chamber with one set of brake applying members, a rod operatively connected to the other set of brake applying members, a manually operated member, and a tie member pivotally connected to said rods and said manually operated member.

In testimony whereof I have hereunto set my hand.

JOHN F. CRAIG.